Figure 1:
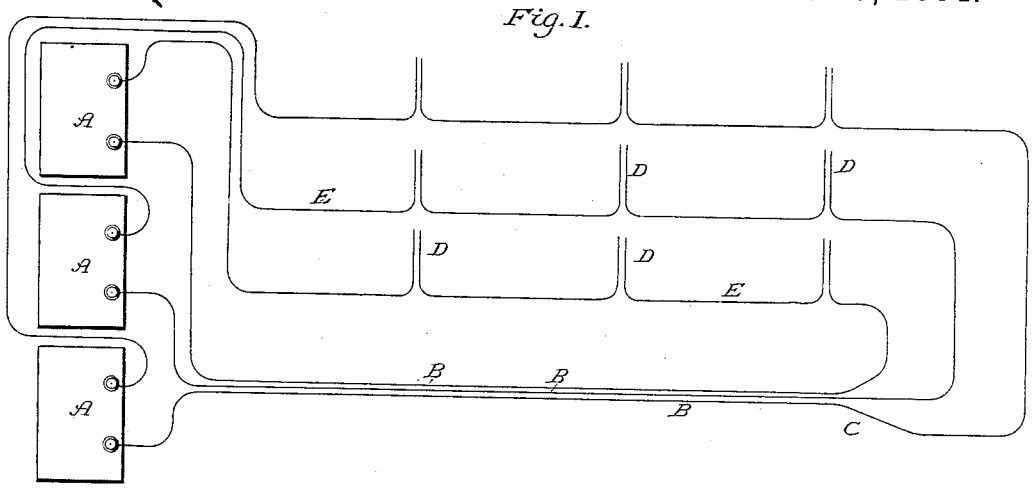

(No Model.) 4 Sheets—Sheet 1.

E. WESTON.
ELECTRIC CIRCUIT.

No. 292,718. Patented Jan. 29, 1884.

Attest:
Raymond F. Barnes.
J. W. Frisby

Inventor:
Edward Weston
By Parker W. Page
atty.

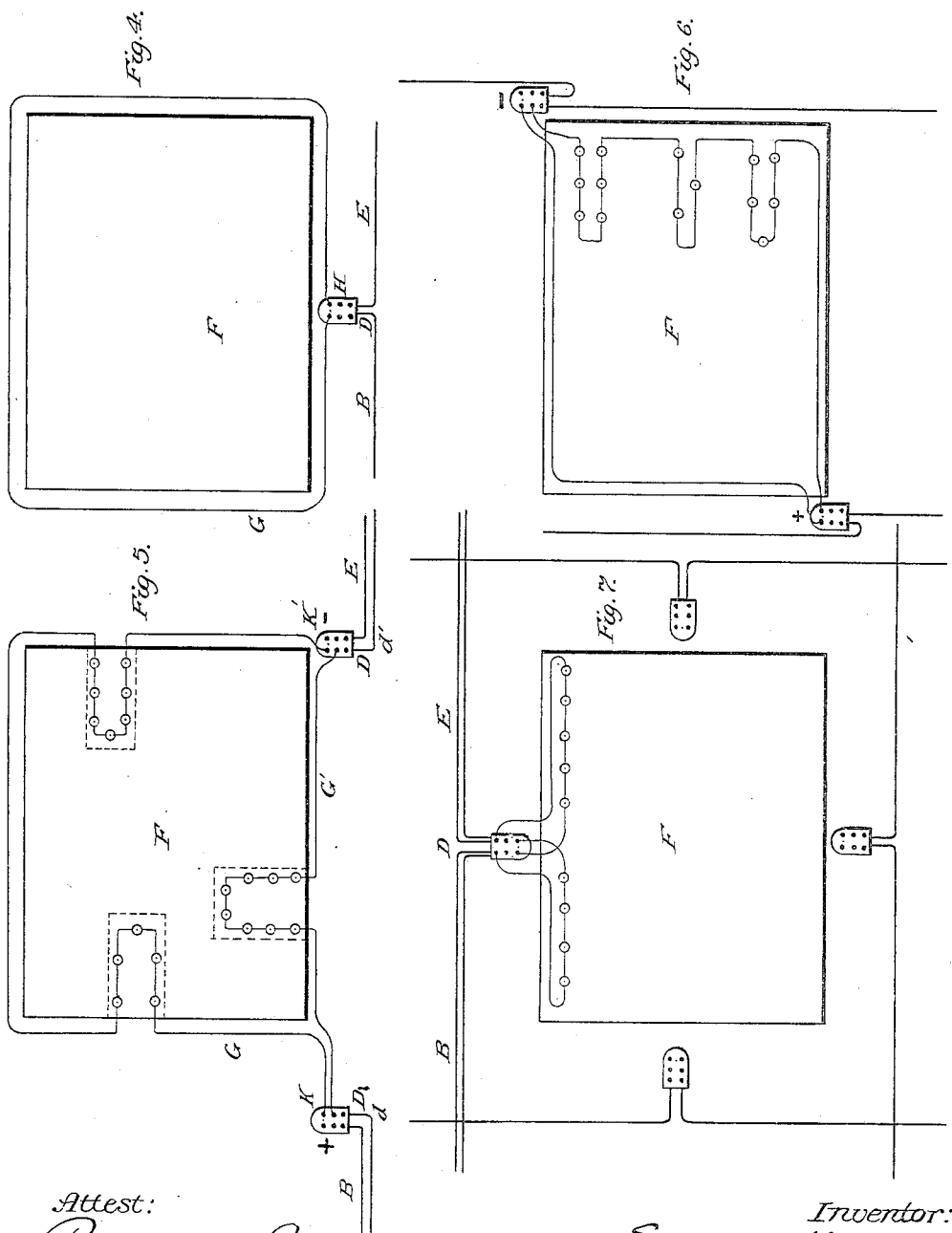

(No Model.)  4 Sheets—Sheet 3.

E. WESTON.
ELECTRIC CIRCUIT.

No. 292,718. Patented Jan. 29, 1884.

Attest:
Raymond F. Barnes.
W. Frisby

Inventor:
Edward Weston
By Parker W. Page
Atty.

(No Model.)
4 Sheets—Sheet 4.
E. WESTON.
ELECTRIC CIRCUIT.
No. 292,718.
Patented Jan. 29, 1884.
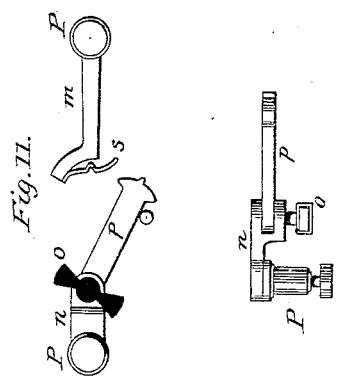
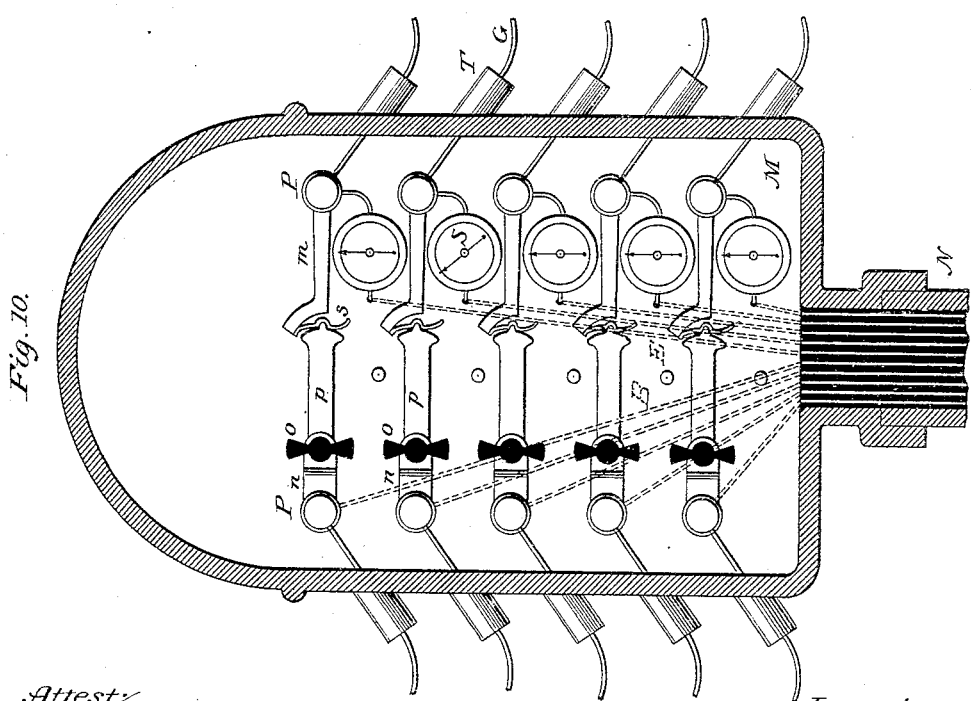
Attest:
Raymond F. Barnes
N. Frisby
Inventor:
Edward Weston
By Parker W. Page
atty.

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

ELECTRIC CIRCUIT.

SPECIFICATION forming part of Letters Patent No. 292,718, dated January 29, 1884.

Application filed January 31, 1883. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Electric Circuits, of which the following is a specification, reference being had to the drawings accompanying and forming a part of the same.

In systems of electric lighting where the current is generated at some central point and distributed through the streets of a city to arc-lamps located, perhaps, a great distance from the source of supply, it is usual to connect with a single circuit a large number of arc-lamps in series. The current required in such a circuit is therefore very intense, and owing to the power of the machines and the resistance which the lamps oppose, a great difference of potential exists between the leading and return conductors of the circuit. The tendency of the current to leak from one to the other, which is due to this extreme difference of potential, has heretofore rendered expensive and complicated all attempts to inclose the conductors in tubes or other conduits for carrying them under the ground or water. Another cause which heretofore has operated against inclosing electric-arc-light conductors in underground conduits is the necessity of having loops from one of the wires in the main conduit at every point where a lamp or group of lamps is likely at some time to be wanted. To form these loops after the mains are laid is both difficult and dangerous. To form them at the start involves a great expense, and the maintenance of a great amount of material, which may stand idle for a long time. By my invention I have avoided these objections and provided a system of conveying and distributing currents adapted for general purposes of electric-arc lighting or similar objects, which is simple, economical, and perfectly safe.

I shall describe my system as applied to a city having intersecting streets and blocks or squares of any ordinary shape and size. All portions of the conductors, except in the immediate vicinity of the lamps with which they are connected, are inclosed in suitable underground conduits, so that they are not exposed to the weather, nor to accidents which are common to all aerial systems. In lieu, however, of running both the leading and return wires in the same conduit, I employ one or more return-conduits. In the leading-conduits I inclose all the wires from the same binding-post of the machines—that is, all positive wires or all negative wires—and this plan I follow throughout the entire system of conduits, arranging the wires therein so that no two wires in a conduit are in the same circuit. The differences of potential between the conductors are in this way reduced to a minimum. When the leading-wires have been carried from the source of supply a sufficient distance to meet the requirements of the district to be lighted, they are brought up through a branch conduit to a junction-box located at a convenient point with reference to a block or square to be lighted. Provision is made in the junction-boxes for taking off one or more loop-circuits, which are carried partly or entirely around the block, preferably on the fronts of the buildings, when such is possible, and in these circuits the lamps needed on that square are inserted. The conductor forming the loop is carried back to the main conduit through the branch conduit mentioned, or through a separate one. Other modifications of this plan, together with the character of the mechanism employed, will be hereinafter described by reference to the drawings, where—

Figure 2:
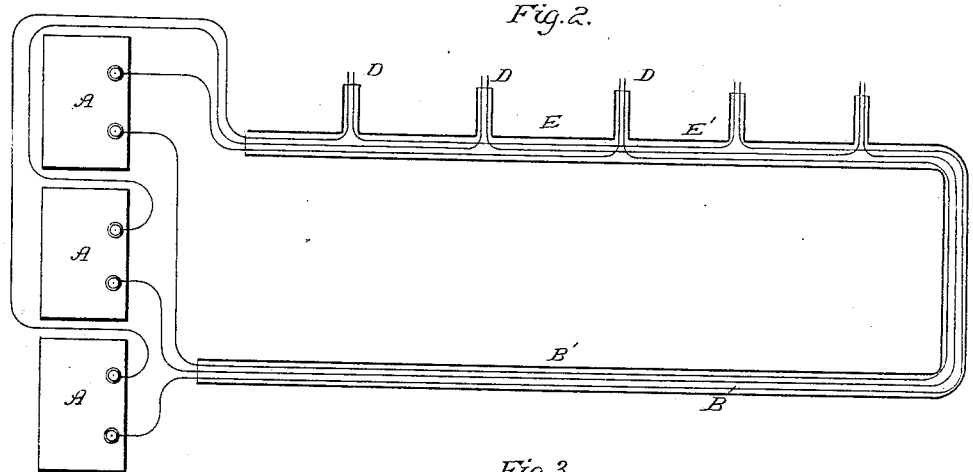
Figure 3:
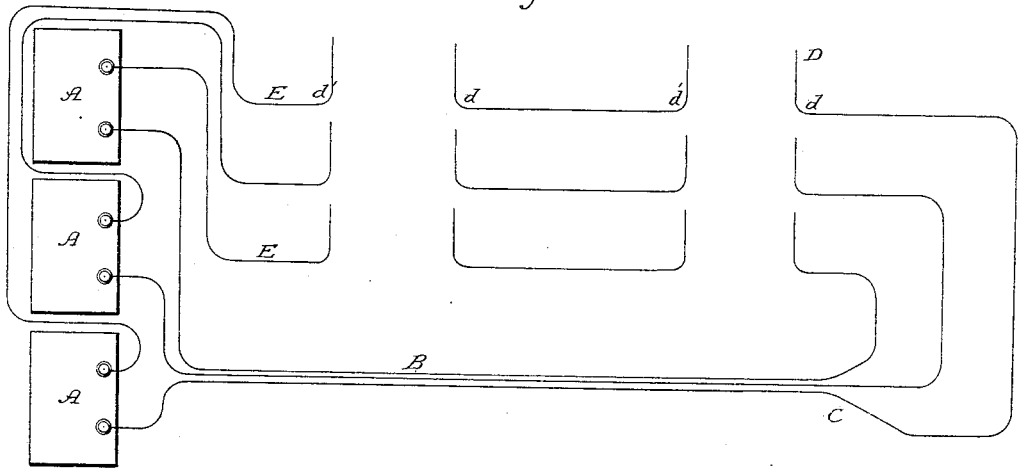
Figure 9:
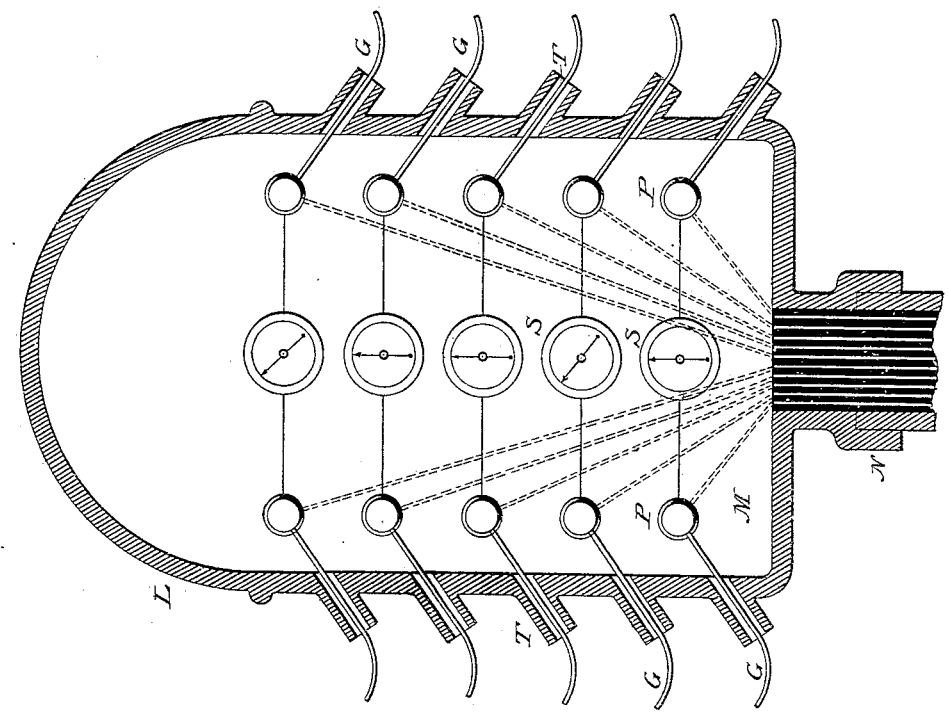
Figure 8:
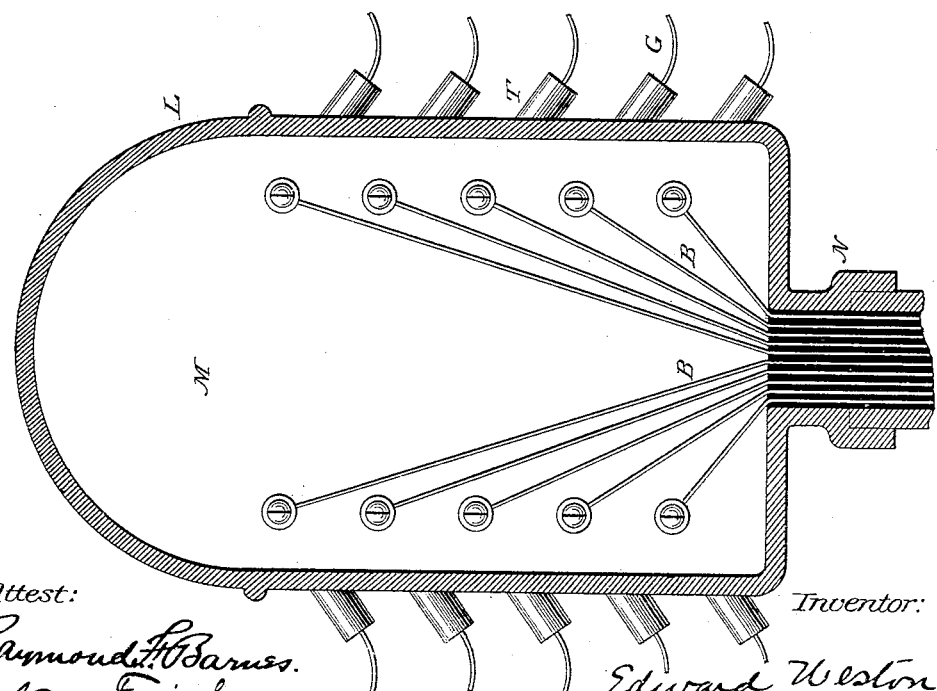

Figure 1 is a diagram illustrating the general plan of circuits invented by me. Figs. 2 and 3 are modified arrangements of the same. Figs. 4, 5, 6, and 7 are diagrams illustrating the invention as applied to the blocks or squares of a city. Fig. 8 is an interior view of the rear of a junction-box; Fig. 9, an interior face view of the same; Fig. 10, a similar view of a modified form of junction-box. Fig. 11 shows the circuit-closing devices employed in the junction-box.

In Fig. 1 A A A represent the dynamo-machines of a central source of supply. B B B are the conductors from the positive binding-posts of the same. From the station at which the machines are located the conductors B are carried in any suitable form of underground conduit to a central point in the district to be illuminated. Let this point be indicated by the letter C. At C the group is divided up into a number of groups or single wires, which are carried to the lamps and back to the negative poles of the machines through separate underground conduits. At the points D D, &c., the conductors are brought up to the surface through conduits of ordinary construction and carried to the lamps. When the circumstances of the case render it feasible, the return-wires may all be inclosed in the same underground conduit, as is illustrated in Fig. 2, and loops formed from any of the conductors at different points along the line where the lamps are wanted. In this figure the inclosing tubes or conduits are outlined and lettered B' and E'. In the remaining figures the conduits are not indicated, the manner of applying them being well understood.

Instead of bringing the conductors back to the underground conduit through the same conduit by which they were led to lamps, they may be brought back through a separate conduit placed at some distance from the first. In this way the tendency to leak or short-circuit between the two sides of the loop, caused by the difference in potential due to the resistance of the lamps, is greatly reduced. This is illustrated in Fig. 3, where B B B are the leading-wires, which are branched at C and carried to lamps or other devices at D D, the loops for this purpose being started from the point $d$ and brought back at the point $d'$.

It is to be observed that the portions of the wires designated by the letter E may be considered as the leading-wires, and the parts B as the return, these terms being used simply for convenience.

In lieu of forming a loop for each individual lamp I form a broken loop on each block, using for this purpose junction-boxes, the specific character of which will be hereinafter described. From the junction-boxes I lead a conductor around or partly around the block on poles, or by preference attaching it to the fronts of the buildings, and with this I connect the lamps.

Referring to Fig. 4, let F represent a block or square in a city, B E an underground conductor or group of conductors. At any central point on the block—as at D—I carry a loop from one of the conductors out to a junction-box, H. I then run a single wire, G, from one of the terminals of the box H around the whole of the block or such portion of it as may be necessary, and in this I insert the lamps to be used on that block. By this arrangement the amount of conductor above ground, as compared with the total amount of conductor used in the system, is the least possible.

When the number of lamps on a block is very large, or to avoid bringing back the wire G to the same junction-box from which it was started, the arrangement shown in Figs. 5 and 6 is to be adopted. In this case one or more of the leading-wires B of an underground system are carried out to a junction-box, K, and the return-wires E of the same circuit are brought up to a similar box, K'. The loop-circuits G G' are then formed around parts of the block from one box to the other, and in these circuits the lamps on the block are arranged. The number of junction-boxes on any given square or block will be determined mainly by the number of lamps needed, and one box may be placed in the center of each side of the block, if so desired, as shown in Fig. 7. In this, as in the other instances described, the object is to avoid, as far as possible, running the wires of a circuit which lead to and return from a lamp or lamps in the same conduit. For this purpose separate branch conduits may lead from the junction-boxes to the leading and return underground conduits; or the branch conduits may be made of larger size than is practicable for the underground or main conduits, so that perfect insulation is assured.

The general plan of the junction-box is shown in Figs. 8 and 9. L is a substantial box or casing divided into two parts by a plate, M, of insulating material. The box L is mounted on a pipe, N, containing insulated passages, through which the conductors B E are led. These conductors are secured to binding-posts P, set in the plate M. On the sides of the box L are suitable openings, T, corresponding in number and position to the binding-posts P. The loop-circuits G are made with these binding-posts. In order that it may be known when a current is passing through any of the loop-circuits, a cross-connection of high resistance, containing a galvanometer, S, is formed across the binding-posts. This junction-box may be used in either of the ways described—that is to say, all the wires leading into a box may be positive wires with respect to the lamps in the circuit G, or all negative, and the circuits G formed from one box to the other, as explained with reference to Figs. 5 and 6; or half the wires may lead to the lamps and half from them. In the former case it is desirable to have galvanometers of simple construction for each wire, the wires being carried once or twice around them. This is illustrated in Fig. 10, where one-half the wires are shown connected with galvanometers S.

In order to connect across the wires on the opposite sides of the tube N, when they are not connected with loop-circuits, I employ the circuit making and breaking device shown in detail in Fig. 11. In electrical contact with one of the binding-posts P is a rigid arm, $m$, provided with an indented spring, $s$. With the opposite binding-posts is connected a plate, $n$, to which is pivoted an arm, $p$, that is turned by an insulating thumb-piece, $o$. The end of arm $p$ is rounded off, and provided with a projecting tooth that enters the indentation of spring $s$ when the arm $p$ is turned upward. When the arm $p$ is in contact with the spring s, the circuit is made between two of the wires, B E, and carried on to the next junction-box.

From the above description the main features of my invention, the objects sought, and advantages secured will be more clearly understood.

What I regard as novel may be stated in general terms to be, first, inclosing conductors in underground or similar conduits in such manner that the portion of a conductor that leads to a lamp or lamps or similar devices, and that portion which returns from the same shall not run through the same portions of the conduits, or, in other words, so that all the conductors at any given point in an underground system of conduits shall belong to separate round wire circuits; second, running the wires of city circuits underground through leading and return systems of conduits and taking off at one or more points on a block a loop-circuit to a junction-box, and running this loop around the whole or a portion of the block, combining in this way underground and aerial systems, so that those portions of the conductors which are between the junction-boxes and the lamps and between the different lamps are the only portions exposed; third, combining, with the underground conduits, junction-boxes centrally or conveniently located with reference to the blocks or squares to be lighted, and constructing these boxes so that the circuits may be made through them from one to another, or so that loop-circuits from the main conductors may be made from them around any portion of the block on which they are situated; lastly, the invention includes certain other features of novelty in the details of the system, which will be pointed out in the claims.

I am aware of Patent No. 194,111, and do not claim anything therein. My invention is intended to apply to a number of round wire circuits arranged in the manner fully set forth.

What I claim, and desire to secure by Letters Patent, is—

1. In a system of electrical generation and distribution, the combination, with the conductors of round wire circuits, connecting the generator or generators with the devices for utilizing the current, of separate underground tubes or inclosing-conduits for both the leading and the return conductors, as and for the purpose set forth.

2. In a system of electrical generation and distribution, the combination, with underground tubes or conduits, of conductors composing the leading or the return main conductors of separate round wire circuits, branch or surface conduits containing one or more of the conductors, and aerial loop-circuits made from the said conductors, and including lamps or similar devices, as set forth.

3. In a system of electrical generation and distribution, the combination, with the generator or generators, of a group of conductors extending to a given point in the district to be lighted, and then branched and carried back to the generators, a single tube or conduit inclosing the group of conductors, and independent tubes or conduits inclosing the branched or return conductors, as and for the purpose set forth.

4. In a system of electrical generation and distribution, the combination, with the generator or generators and devices for utilizing the current, of underground round wire circuit conductors connecting the generators with such devices, separate tubes or inclosing-conduits for both the leading and return conductors, and separate branch tubes or conduits for inclosing those portions of the conductors that are led up to and back from the surface of the ground, as and for the purpose set forth.

5. In systems for the electric illumination of cities and towns, the combination, with underground tubes or conduits and conductors, all of separate round wire circuits contained therein, of junction-boxes located at one or more given points on the blocks or squares, and aerial loop or connecting circuits made from the junction-boxes and including lamps or other devices, as described.

In testimony whereof I have hereunto set my hand this 29th day of January, 1883.

EDWARD WESTON.

Witnesses:
 PARKER W. PAGE,
 W. FRISBY.